W. P. THOMPSON.
AEROPLANE.
APPLICATION FILED JULY 16, 1917.
1,301,196.
Patented Apr. 22, 1919.
5 SHEETS—SHEET 2.
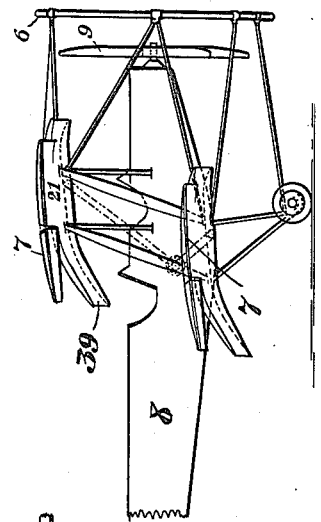
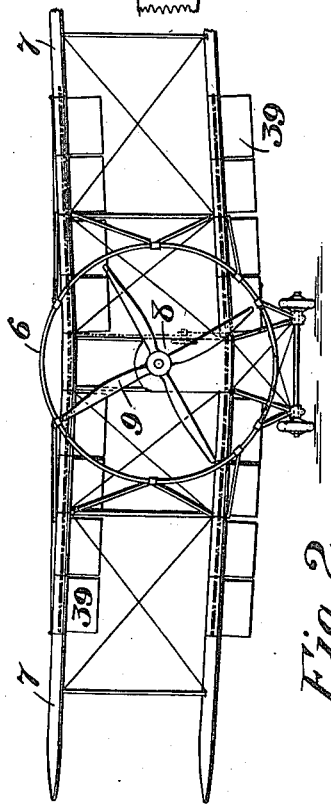
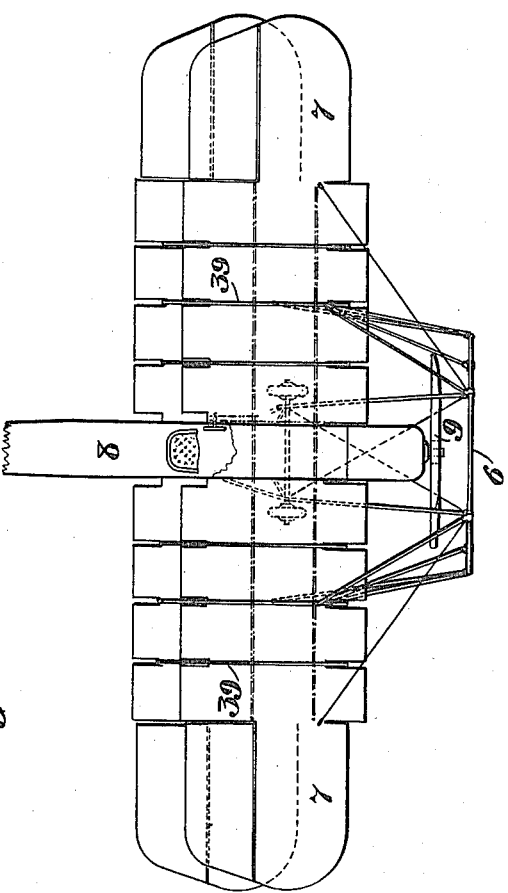

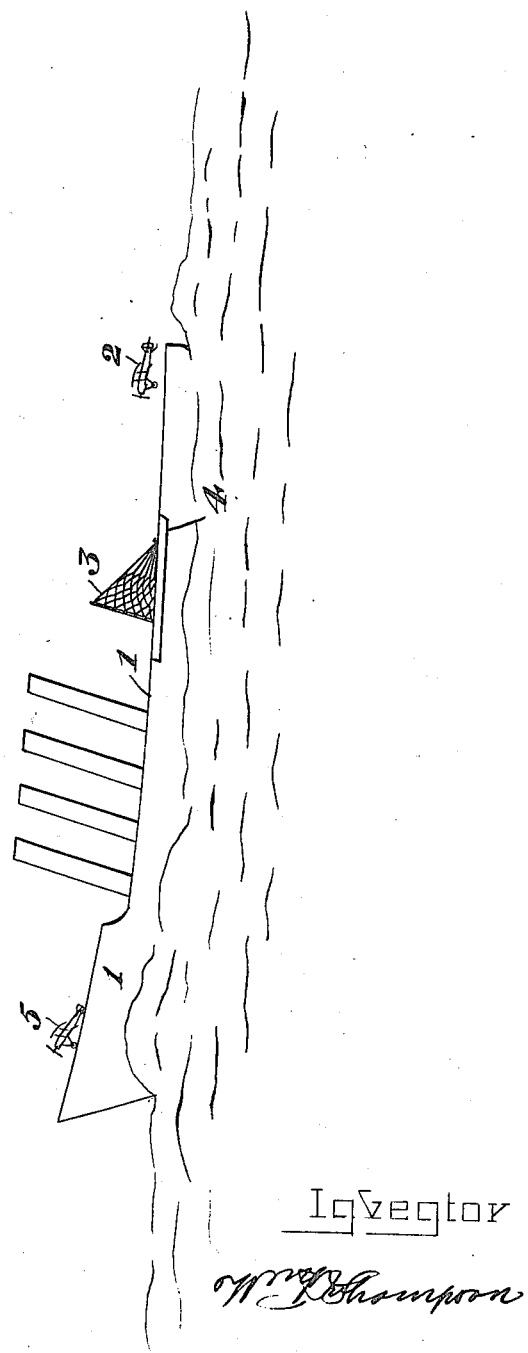

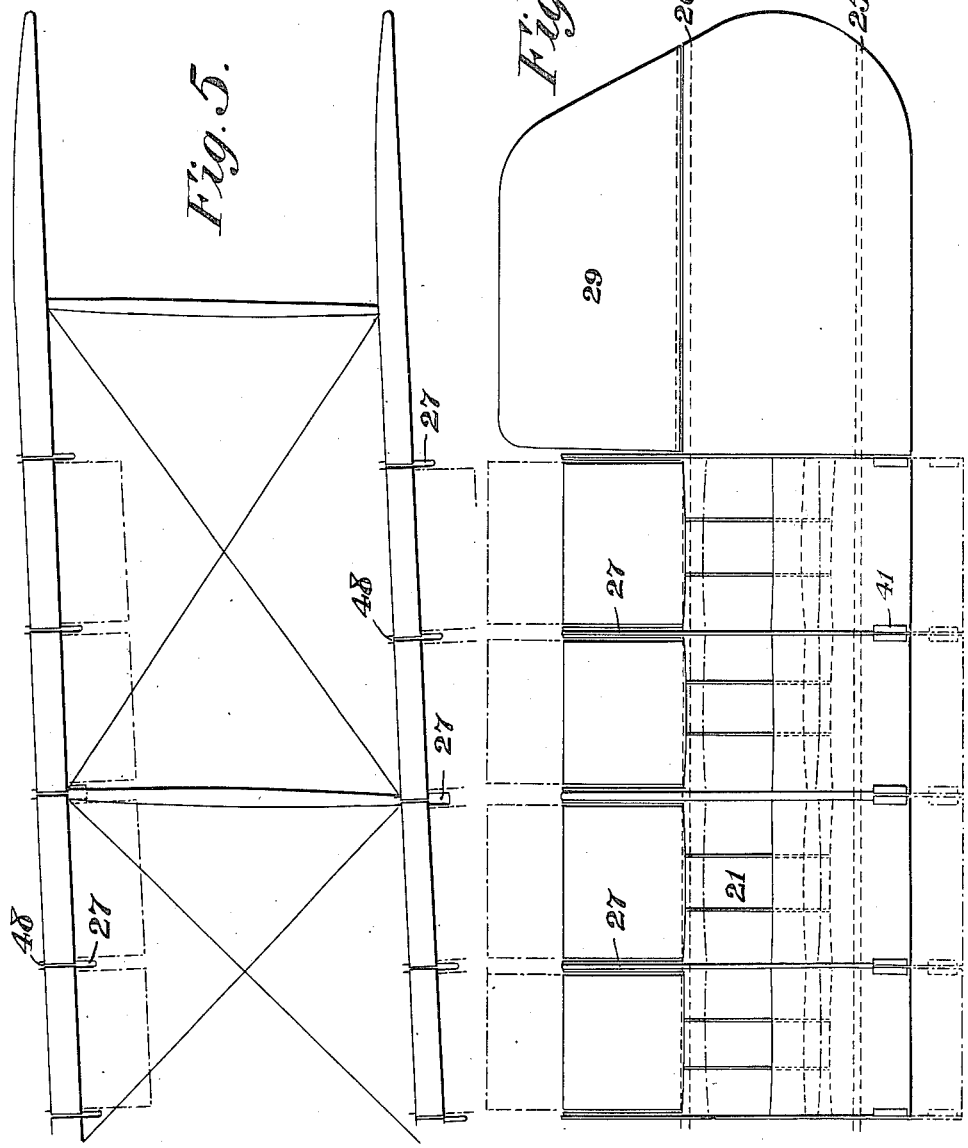

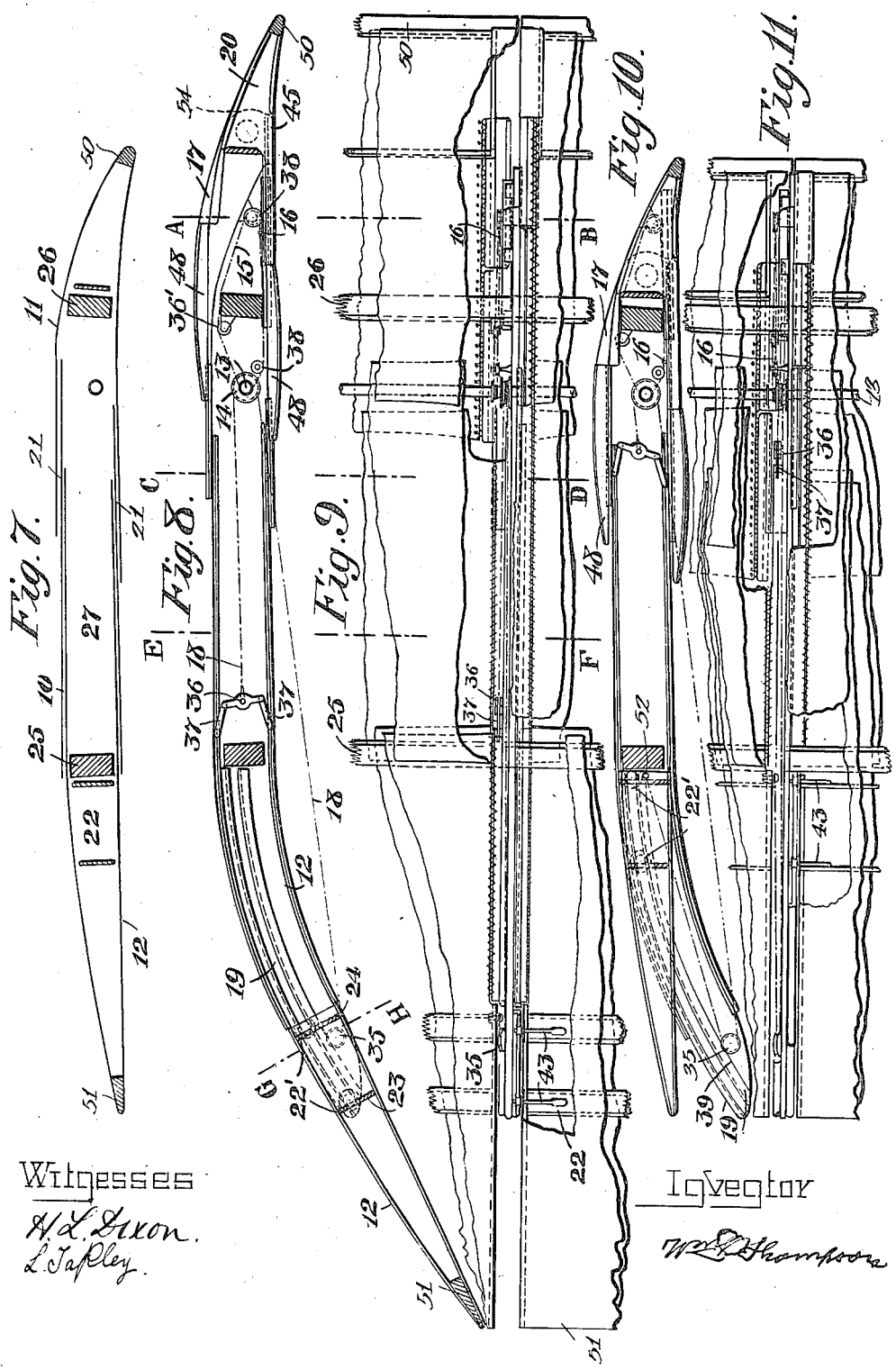

W. P. THOMPSON.
AEROPLANE.
APPLICATION FILED JULY 16, 1917.
1,301,196.
Patented Apr. 22, 1919.
5 SHEETS—SHEET 5.
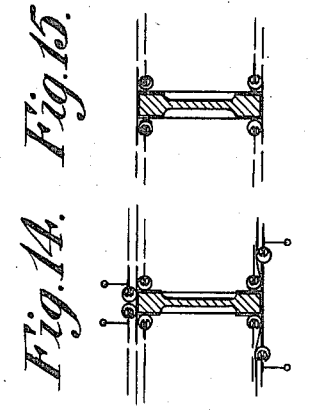
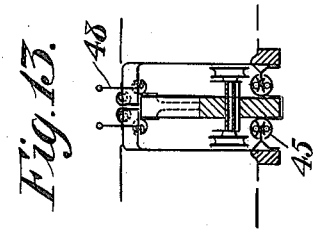
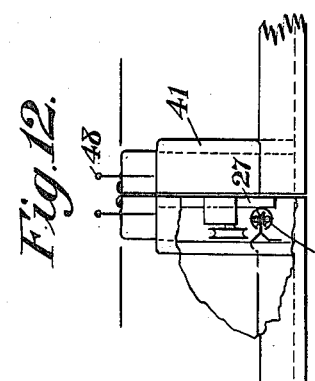
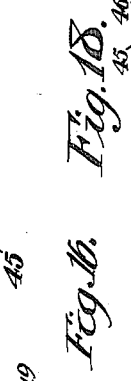
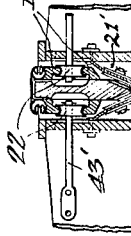
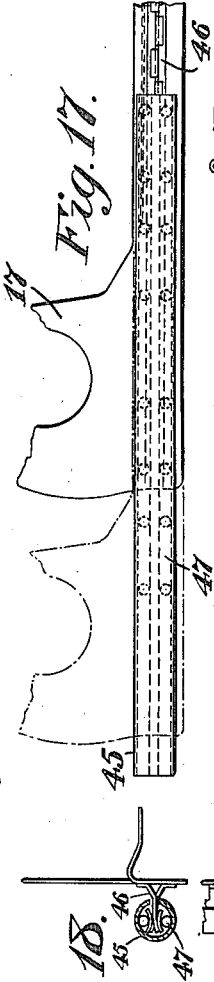
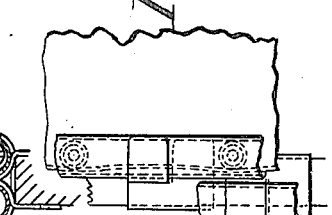
Witnesses
H. L. Dixon
L. Sakley
Inventor
W. P. Thompson

UNITED STATES PATENT OFFICE.

WILLIAM PHILLIPS THOMPSON, OF LIVERPOOL, ENGLAND.

AEROPLANE.

1,301,196.  Specification of Letters Patent.  Patented Apr. 22, 1919.

Application filed July 16, 1917. Serial No. 180,924.

*To all whom it may concern:*

Be it known that I, WILLIAM PHILLIPS THOMPSON, subject of the King of Great Britain, residing at Liverpool, in the county of Lancaster, in the Kingdom of England, have invented certain new and useful Improvements in Aeroplanes, of which the following is a specification.

This invention has for its object an improvement on my former application, Serial No. 161,205.

It is to enable the flying machine to fly on and off the stern of the steamer while it is going at full speed.

The machine is so designed on the principle of my former specification, Serial No. 161,205 that in starting from the ship and in alighting upon it, it shall have broad and also bellied wings, but that when it is flying freely the wings shall be narrowed to near the minimum width. In this condition it has nearly the ordinary contour, nearly straight in cross section. In this condition it can go at a very great speed. It can thus fly around the ship in all directions, or zig-zag in front of it at high speed, and warn it of danger such as submarines, icebergs, rocks or the like, and can look out for other vessels.

It is best described by aid of the accompanying drawings, in which,

Figure 1 shows a diagrammatic side view of a steamer with aeroplanes.

Fig. 2 is a front view of the aeroplane with propeller and a ring that is around the propeller but in front of it and of larger diameter, so as to prevent it catching the net.

Fig. 3 is a plan view of the machine and ring, the tail being omitted, and

Fig. 4 a side elevation of Fig. 3.

Fig. 5 an end view of parts of two wings of a biplane and of other parts,

Fig. 6 a plan of same.

Fig. 7 is a diagrammatic vertical cross section of the wing as furled or contracted showing the three parts, Fig. 8 a longitudinal section of the wing as fully expanded. The tail in this instance is curved over more than is usually necessary; about half the angle of curvature shown would most probably be sufficient for most purposes.

Fig. 9 is a plan view of part of the wing with pieces broken away so as to show the mechanism and also the various methods of attaching the shutters or fabric.

Fig. 10 is a longitudinal section of the wing when extended full width and

Fig. 11 a plan view with various parts broken off so as to show the mechanism.

Fig. 12 is a front view of a part of the nose.

Fig. 13 a section through A—B of Figs. 8 and 9.

Fig. 14 a section through lines C—D of Figs. 8 and 9, and Fig. 15 a similar section through E—F of Figs. 8 and 9, and Fig. 16 a section through G—H of Fig. 8.

Fig. 17 is a side elevation of the nose ball race guides and stiffening plate. The dotted lines show this plate as it is moved farther on, when expanding the wing.

Fig. 18 is a transverse section through Fig. 17, and

Fig. 19 a plan view of the same.

Figs. 20 and 21 are two plans of the roller balls and races for the shutters, also showing how the cover or shutter is laced up.

Figs. 22 and 23 are corresponding sections.

Fig. 24 shows a roller ball (partly in section) in the shutter ball race, and on a slightly larger scale, and Fig. 25 shows a view at right angles to Fig. 24.

Figs. 26, 27 and 28 show a little carriage used in nose ball race to retain the balls at the proper spacing and location.

Fig. 29 a plan view of shutter and roller ball race and contiguous parts on an alternative design.

Fig. 30 a vertical section of same.

Referring to Fig. 1, 1 is the steamer, 2 an aeroplane flying on to the steamer at the stern, 3 a net-work placed to catch the flying machine if it goes too far, 4 is a sort of gangway alongside the net-work 3 so as to increase the width of the deck when required at this point. When not in use this gangway can be folded up or elevated. The flying machine when it wants to fly off when the steamer is going at full speed runs along this gangway and flies off at the front end of it. If however the steamer will admit of it, the flying machine can be carried to the front at 5, and can fly off from the bow.

In Figs. 2, 3, and 4, 6 is a ring placed around and a little in front of the propeller 9 so that in case by any means the machine runs into the net, the propeller will not strike it. This ring is well braced as shown. If as I rather prefer, the propeller is in the rear of the aeroplane this ring 6 will not be required. Most authorities however now require the engine and propeller to be in front, as such arrangement has important advantages. 7, 7 are the wings of the biplane a little staggered as shown, and 8 is the fuselage.

In Figs. 5 and 6, 25, 26 are the two main spars. 27 are side ribs with downward projecting parts near the tail of the wing. These project downward too much in the drawing as only in rare cases will such a strong bellying of the wing be required as seen in Figs. 8 and 10 about half this amount will be enough in most cases. 29 are the ailerons or "flaps" carried on the spars 25 for steering, and 41 are cover plates for inspection purposes.

Referring now to Figs. 7, 8, 9, 10 and 11, the covering of the wing as in my former patent is composed of three parts, a central part 10 which is always stationary, being fixed to the cross ribs 27 except where the brackets 42, Fig. 30 are in the way, a front nose portion 11, and a hind portion or tail 12. These portions 11 and 12 have solid parts for a short distance, and then are provided with shutters 21 carried on roller-balls 31—33, shown in Figs. 20, 22, 23, 24 and 30, the roller balls running in split tubes rigidly soldered to steel brackets screwed to the ribs 27 in the manner set forth in Figs. 13–16 and in detail Fig. 30. These shutters can be plates of aluminum or of three-ply wood or even doped canvas or other wellknown covering, the covering is stretched tight between the ribs, and 22 are stiffening pieces to hold the tail pieces from collapsing. The nose is drawn in and out by the endless rope 15 riveted to the shutter at 16. The tail is pulled out by the rope 18 passing over pulley 35, and attached to the front end of the tail through the yoke 36. It takes its motion from the sprocket wheel 14, Fig. 8. The two sprocket wheels on shaft 13 are somewhat different diameters in order to give greater motion to the tail than to the nose. This difference is a little exaggerated in the drawings.

Referring now especially to Fig. 8, 13 is a tubular shaft extending the whole length of the wing, and driven from the fuselage by sprocket or other gearing in the manner set forth in my former patent. On this are wheels 14. Around one of these wheels is an endless rope or chain 15 which is attached to the nose shutter at 16. By turning the wheels 14 the rope 15 is drawn around, drawing the nose in toward the center of the wing, the nose sliding on ball bearings and pulling the shutters on their roller balls along the split tube in the manner set forth. As the top portion of the nose is weak it is provided with a plate screwed to the wood forming the side of the nose to which is attached the moving part of the slide 17 and having a fin 48 shown clearly in cross section in Figs. 5 to 14 and 21 alongside each rib. The rope 18 by the revolution of the shaft 14 is wound up on a pulley 14 drawing the tail inward, the tail running in the roller guide 19. The ends of both the nose 20 and the tail 12 for a considerable distance are made of aluminum or three-ply board or the like so as to be stiff. The nose is held in position by the ball race guides 45 which are attached to the cross ribs 27. 46 is a movable guide piece which is retained in ball race guides 45 by ball carriages 47 above and below. The diameter of the balls is determined somewhat large relatively to the bore of the guides 45 and the thickness of the guide piece 46 so as to slightly spring open the ball race 45 at whatever point the ball carriages 47 are located and in this manner are prevented from getting out of position. The ball carriages only move half the distance that the guide pieces 46 are moved.

In order to give sufficient strength and rigidity to the nose 20 plates 17 are screwed to the wood sides 54 of same and have continuations which pass under and above the ribs 25. The lower extension carries the guide piece 46 and the upper extension is bent over to form the part to which the covering is attached to close in the mechanism. A fin is attached to the top of this plate to give a rigid support to the small fin or girder 48 which carries roller balls running in the split tube ball races. A similar small girder is attached to the lower extension and these two girders bridge the gap which would otherwise exist when the nose is extended, and support the covering which is stretched between them. The tail is guided into position by the roller guides 19 which are screwed to the cross ribs 27 near their ends where these are bent down as shown at 39.

In these guides the rollers 22' run. The grooved rollers 22' are carried upon the ends of tubular shafts 43' which are mounted or secured to the tail 12 by a screw plate soldered to them said plates being screwed to the sides of the solid part of the tail and the ends of the tubular shafts flattened out and screwed to the stiffeners 22. The grooved rollers 22' are a little smaller in diameter than the distance between the guides 19 and thus roll freely on whichever guide they are bearing without touching the other guide. The whole stress due to air pressure upon the solid part of the tail is borne by these rollers and guides. 25 and 26 are the two main spars of the wing to which the side ribs 27 are attached. 29, Fig. 6 are the ailerons which are carried and hinged on the rib 26 in the usual manner. They do not move outward and inward with the tail of the wing, but are stationary only revolving on their hinges when moved by the control in the ordinary manner. 30 is a plate to which the roller balls 31, are attached, see Fig. 24. The half ball 32 is formed with an axle which is passed through the plate 30 after which the half ball 33 which fits up to a shoulder on the smaller part of the axle is put on and the axle end riveted over so as to make a roller ball which will run freely along the inside edges of the split tube when the plate 30 is in tension between the ribs. The covering 34 in each instance is attached to the sliding plate 30 by means of lacing as shown in Figs. 20 to 23, or eyelets 43 Fig. 30 can be formed in the covering each with a roller ball running in the split tube, in which case the covering is preferably laced down the center. The outside lacing is laced in the manner of boot-laces on eyelet hooks as shown in Fig. 23, but the inside one (as it cannot have projections) is laced as shown in Fig. 22.

Going more into detail, to manipulate the tail or trailing edge of wing, the ropes or chains 18 are carried on the outer pulley 14 fixed pulley 35, and yoke 36. Yoke 36 is attached by links 37 to the shutters 12, drawing the tail on rollers 21' along between the roller guides 19. The shutters have balls 43 which run on ball races 42 fixed to the top and bottom of ribs 27 secured by fasteners 44 which clip the split tubes above and below and are soldered to them and screwed to the cross ribs 27. The endless rope 15 in a similar manner is carried from the smaller wheel 14 along the guide pulleys 38, and draws the nose in and out by being riveted to its shutter continuation at 16.

The tail is drawn out and pulled in, in the following manner. It is supported entirely on the two sets of balls or rollers 22 (22') running in the ball races 19. The rope 18 attached to the yoke 36 runs around the pulley 14, then back to the pulley 35, and then to a point shown in Fig. 10 on the end board 24 of the tail. Moving the pulley 14 in one direction the yoke 36 attached by flexible connections to the tail pulls the latter in until the board 24 comes up close to the main rib 25. To pull out the tail the pulley 14 is run in the reverse direction, and the cord pulling on the end 24 pulls the tail out, the tail being held in position by the two balls 22 in the ball race 19.

The mode of action is as follows:—The machine is guided by its ailerons and rudder in the ordinary manner of ailerons with a control handle. I have not therefore depicted the control. The aviator sitting in his seat guides the machine by this ordinary control, and when he comes to the steamer, and wants to land on it, he runs out both the nose and the tail to their fullest extent as shown in Fig. 8. This greatly retards his motion but there is such a large amount of surface that he can go at a very slow speed, and yet keep elevation, he therefore lessens his speed to that a little faster than the deck of the steamer, and lands gently on the deck. Should however he go too far, the cage around the propeller, instead of the propeller, strikes the network. In practice however probably neither cage, which is a considerable impediment as regards speed, nor netting, will be required. When he wishes to fly off again he brings his machine as near the stern of the ship as possible, and then runs or flies forward on to the gangway and from the end of the gangway flies off into the air. When he has risen a sufficient distance he draws in both the nose and the tail by actuating the shaft 14, and can now travel at a very high speed owing to the narrowness of his wings. He can thus look out for dangers and if searching for ship-wrecked people or anything else he can see as far as the rotundancy of the earth and the atmospheric conditions will allow him, and can signal by wireless telegraphy or otherwise to the ship, or deliver messages or other things in hollow balls thrown from the aeroplane.

I declare that what I claim is:—

1. A flying machine formed with main girders and curved cross girders and having a variable breadth of wing, in which the wing tail when drawn out is automatically bent down at a less curvature than the curve of the cross girders adjacent thereto and carrying it; but is substantially in line with the rest of the wing and the girders when the wing is contracted, whereby the wings can be greatly extended in width and hold a large amount of air in their concavities in alighting or rising, but can be narrowed and of little resistance in ordinary flight.

2. In a flying machine wing of variable width, the combination of a wing skeleton consisting of main ribs and cross ribs, ball roller races carried by the cross ribs, a nose and a tail each having shutters carried by the ball roller races, the races carrying the nose shutters being nearly parallel with the general contour of the wing laterally and the race carrying the tail and shutters being curved downward.

3. In an aeroplane, the combination of a framework, an expansible wing comprising a tail and nose movable on said framework, mechanism for moving the tail and nose, ball races on which the same travel and means for causing the tail to bend downward to a lesser curvature than the adjacent framework when the wing is fully expanded, whereby great buoyancy is obtained through the concavity and wide surface of the wing.

4. In a wing of variable width, the combination of the wing skeleton, consisting of main spars and cross ribs, a fixed central part of the cover attached rigidly to the cross ribs, ball races on the cross ribs, tail and nose and shutters carrying balls traveling in the ball races, strengthening strips close to the balls attached to the shutters so as to act as a strengthening girder and standing out vertically.

5. In an aeroplane wing of variable width, the combination of shutters forming upper and lower surfaces of the wing and having stiff edges and balls carried thereon, a ball race carrying the said balls, a yoke connected with the upper and lower shutters driven from the fuselage and means for winding the yoke and the shutters in and out.

6. In a wing of variable width, the combination of a nose and tail piece, shutters attached to each of them and forming a continuation of their upper and lower surfaces, means for driving them comprising a shaft carrying two pulleys of different diameters, means connecting said pulleys with said nose and tail pieces and adapted to draw said nose and tail pieces in and out.

7. In a wing of variable width with fore and aft movable shutters thereon, a shaft and two pulleys driven from the fuselage, bands passing around said pulleys and each actuating one set of shutters, the two sets of shutters being drawn in opposite directions.

8. The combination of a tail, tail shutters attached thereto, ball rollers on the shutters, ball races carrying the balls, a fixed pulley driven from the fuselage and a propelling cord adapted to draw the shutters and consequently the tail in and out, substantially as described.

9. In a wing of variable width, the combination of a nose, sliding shutters attached to said nose, ball rollers attached to said shutters on both sides, ball races fixed to the aeroplane holding said ball rollers, an endless rope or chain attached to the shutter, a fixed pulley driven from the fuselage carrying the rope attached to the shutter and passing around this pulley and means for guiding the rope above and below the main ribs.

10. In a wing of variable breadth, the combination of the ribs, the tubular ball races attached thereto, the ball rollers therein, flexible fabric with metal edged plates near its edge carrying the said ball rollers and means for putting a strain on the fabric so as to keep it distended in nearly a flat plane between the two ball races.

11. In a wing of variable breadth, the combination of the fabric, the eyelets therein, axles through the eyelets carrying ball rollers, and tubular ball race and means for putting a tensile strain on the fabric whereby the balls are forced to run on the inner surfaces of the tubes laterally.

12. In an aeroplane wing, the combination of a wing tail other than an aileron and means for curving it around to an angle with the rest of the wing and of straightening it out, whereby it can be made to hold the wind in the concavity between it and the flat portion of the wing, or fly with little resistance when in rapid flight, the width of the wing being expanded in rising and reduced for quick speed.

13. In an aeroplane, the combination of the main spars, the cross girders longitudinal to the direction of flight, the central covering attached to the cross girders and fore and aft coverings movable on the cross girders and held in tension between them, but when expanded bent down at the tail to a very much lesser angle than that of the cross girders adjacent.

In witness whereof, I have hereunto signed my name this 15 day of June, 1917, in the presence of two subscribing witnesses.

WM. PHILLIPS THOMPSON.

Witnesses:
  CHAS. LESLIE,
  H. R. SHOOBRIDGE.